(12) United States Patent
Masai et al.

(10) Patent No.: US 11,707,836 B2
(45) Date of Patent: Jul. 25, 2023

(54) GEAR DEVICE AND ROBOT

(71) Applicant: Seiko Epson Corporation, Toyko (JP)

(72) Inventors: Satoru Masai, Ina (JP); Yuya Kataoka, Azumino (JP); Nobuyuki Takehana, Matsumoto (JP); Yoshiyuki Soya, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/328,129

(22) Filed: May 24, 2021

(65) Prior Publication Data

US 2021/0362324 A1 Nov. 25, 2021

(30) Foreign Application Priority Data

May 25, 2020 (JP) .................. 2020-090444

(51) Int. Cl.
 *F16H 1/32* (2006.01)
 *B25J 9/10* (2006.01)
 *F16H 49/00* (2006.01)

(52) U.S. Cl.
 CPC .......... *B25J 9/1025* (2013.01); *F16H 49/001* (2013.01)

(58) Field of Classification Search
 CPC .............. F16H 49/001; B25J 9/1025
 See application file for complete search history.

(56) References Cited

U.S. PATENT DOCUMENTS

2020/0278017 A1* 9/2020 Hofmann .............. F16H 49/001

FOREIGN PATENT DOCUMENTS

| JP | 2001-059153 A | 3/2001 |
| JP | 2019-086087 A | 6/2019 |

OTHER PUBLICATIONS

Dictionary of Mechanical Engineering, G.H.F. Nayler, 1996, Society of Automotive Engineers, Inc., Forth Edition, p. 293.*

* cited by examiner

*Primary Examiner* — William C Joyce
(74) *Attorney, Agent, or Firm* — Harness, Dickey & Pierce, P.L.C.

(57) ABSTRACT

A gear device includes an internal gear, an external gear having flexibility configured to partially mesh with the internal gear and rotate around a rotation axis relatively to the internal gear, and a wave generator configured to come into contact with an inner circumferential surface of the external gear and move a meshing position of the internal gear and the external gear in a circumferential direction around the rotation axis. The external gear includes a cylindrical section including a first end portion with which the wave generator is in contact and a second end portion adjacent to the first end portion along the rotation axis. An inner circumferential surface of the first end portion includes a polished surface. An inner circumferential surface of the second end portion includes a lathe-cut surface.

7 Claims, 10 Drawing Sheets

GEAR DEVICE AND ROBOT

The present application is based on, and claims priority from JP Application Serial Number 2020-090444, filed May 25, 2020, the disclosure of which is hereby incorporated by reference herein in its entirety.

BACKGROUND

1. Technical Field

The present disclosure relates to a gear device and a robot.

2. Related Art

In a robot including a robot arm, for example, a joint section of the robot arm is driven by a motor. In general, rotation of the motor is decelerated via a speed reducer and transmitted to an arm. As such a speed reducer, for example, a gear device described in JP-A-2001-59153 (Patent Literature 1) has been known.

The gear device described in Patent Literature 1 includes an annular rigid internal gear, a cup-shaped flexible external gear disposed on the inner side of the rigid internal gear, and an elliptical wave generator fit on the inner side of the flexible external gear. The flexible external gear includes a cylindrical body section, an annular diaphragm sealing one end of the body section, and external teeth formed on the outer circumferential surface of the other opening end of the body section. Patent Literature 1 discloses to apply nitriding to the surface of the external teeth after applying shot peening and apply the nitriding to the outer surface of the flexible external gear other than the external teeth without applying the shot peening. The strength of the external teeth surfaces is improved and fragility of the body section is avoided in this way, leading to extension of the life of the gear device.

On the other hand, the study of the inventor has revealed that not only a state of the outer surface of the flexible external gear but also a state of the inner surface of the flexible external gear affects the life of the gear device. However, in the gear device described in Patent Literature 1, since machining and treatment are not applied to the inner surface of the flexible external gear, sufficient extension of the life cannot be achieved.

SUMMARY

A gear device according to an application example of the present disclosure includes: an internal gear; an external gear having flexibility configured to partially mesh with the internal gear and rotate around a rotation axis relatively to the internal gear; and a wave generator configured to come into contact with an inner circumferential surface of the external gear and move a meshing position of the internal gear and the external gear in a circumferential direction around the rotation axis. The external gear includes a cylindrical section including a first end portion with which the wave generator is in contact and a second end portion adjacent to the first end portion along the rotation axis. An inner circumferential surface of the first end portion includes a polished surface. An inner circumferential surface of the second end portion includes a lathe-cut surface.

A robot according to an application example of the present disclosure includes: a first member; a second member configured to turn with respect to the first member; the gear device described above configured to transmit a driving force for turning the second member relatively to the first member; and a driving source configured to output the driving force to the gear device.

DESCRIPTION OF EXEMPLARY EMBODIMENTS

A gear device and a robot according to the present disclosure are explained in detail below based on preferred embodiments shown in the accompanying drawings.

1. Robot

First, a robot is briefly explained.

Figure 1:
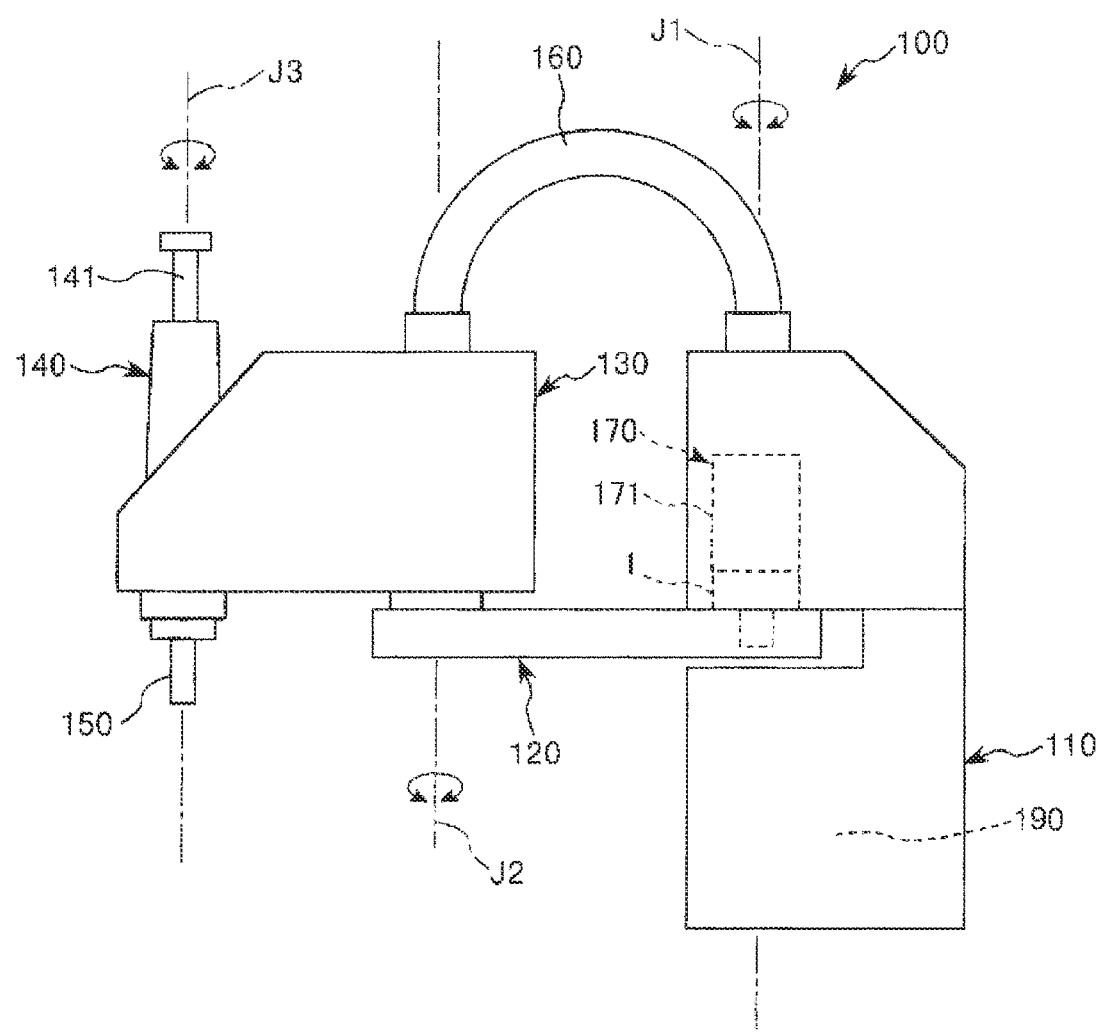
FIG. 1 is a side view showing a schematic configuration of a robot according to an embodiment.

FIG. 1 is a side view showing a schematic configuration of a robot according to an embodiment. In the following explanation, for convenience of explanation, the upper side in FIG. 1 is referred to as "upper" and a lower side in FIG. 1 is referred to as "lower". A base side in FIG. 1 is referred to as "proximal end side" and the opposite side of the base side, that is, an end effector side is referred to as "distal end side". The up-down direction in FIG. 1 is represented as "vertical direction" and the left-right direction in FIG. 1 is represented as "horizontal direction". Further, a direction in which a rotation axis "a" described below extends is represented as "axial direction". "Direction" in this specification includes both of a direction on one side and the opposite direction of the direction on one side along an axis.

A robot 100 shown in FIG. 1 is a robot used for, for example, work such as supply, removal, conveyance, and configuring the precision instrument. The robot 100 includes, as shown in FIG. 1, a base 110, a first arm 120, a second arm 130, a work head 140, an end effector 150, and a pipe 160. The sections of the robot 100 are briefly explained in order below. "Turn" includes moving in both directions including one direction and the opposite direction of the one direction with respect to a certain center point and rotating with respect to the certain center point.

The base 110 is fixed to, for example, a not-shown floor surface by bolts or the like. A control device 190 that collectively controls the robot 100 is set on the inside of the base 110. The first arm 120 is coupled to the base 110 to be capable of turning, with respect to the base 110, around a first axis J1 extending along the vertical direction. That is, the first arm 120 turns relatively to the base 110.

A first driving section 170 is set in the base 110. The first driving section 170 includes a motor 171 (a driving source), which is a first motor such as a servomotor that generates a driving force for turning the first arm 120, and a gear device 1, which is a first speed reducer that decelerates rotation of the motor 171. An input shaft of the gear device 1 is coupled to a rotating shaft of the motor 171. An output shaft of the gear device 1 is coupled to the first arm 120. Accordingly, when the motor 171 is driven and a driving force of the motor 171 is transmitted to the first arm 120 via the gear device 1, the first arm 120 turns in a horizontal plane around the first axis J1.

The second arm 130 capable of turning around a second axis J2 with respect to the first arm 120 is coupled to the distal end portion of the first arm 120. In the second arm 130, although not shown, a second driving section including a second motor that generates a driving force for turning the second arm 130 and a second speed reducer that decelerates rotation of the second motor is set. The driving force of the second motor is transmitted to the second arm 130 via the second speed reducer, whereby the second arm 130 turns in the horizontal plane around the second axis J2 with respect to the first arm 120.

The work head 140 is disposed at the distal end portion of the second arm 130. The work head 140 includes a spline shaft 141 inserted through a not-shown spline nut and a not-shown ball screw nut coaxially disposed at the distal end portion of the second arm 130. The spline shaft 141 is capable of rotating around a third axis J3 shown in FIG. 1 and is capable of moving in the up-down direction with respect to the second arm 130.

In the second arm 130, although not shown, a rotary motor and an elevation motor are disposed. A driving force of the rotary motor is transmitted to the spline nut by a not-shown driving force transmitting mechanism. When the spline nut regularly and reversely rotates, the spline shaft 141 regularly and reversely rotates around the third axis J3 extending along the vertical direction.

On the other hand, a driving force of the elevation motor is transmitted to the ball screw nut by a not-shown driving force transmitting mechanism. When the ball screw nut regularly and reversely rotates, the spline shaft 141 moves up and down.

The end effector 150 is coupled to the distal end portion of the spline shaft 141. The end effector 150 is not particularly limited. Examples of the end effector 150 include an end effector that grips a conveyed object and an end effector that machines a workpiece.

A plurality of wires connected to electronic components, for example, the second motor, the rotary motor, and the elevation motor disposed in the second arm 130 are drawn around to the inside of the base 110 through the pipe 160 that couples the second arm 130 and the base 110. Further, such a plurality of wires are bound in the base 110 to thereby be drawn around to the control device 190 set in the base 110 together with wires connected to the motor 171 and a not-shown encoder.

As explained above, the robot 100 includes the base 110, which is a first member, the first arm 120, which is a second member provided to be capable of turning with respect to the base 110, the gear device 1 that transmits a driving force from one side to the other side of the base 110 and the first arm 120, and the motor 171, which is a driving source that outputs a driving force to the gear device 1.

The first arm 120 and the second arm 130 may be collectively grasped as "second member". The "second member" may further include the work head 140 and the end effector 150 in addition to the first arm 120 and the second arm 130.

In this embodiment, the first speed reducer is configured by the gear device 1. However, the second speed reducer may be configured by the gear device 1. Both of the first speed reducer and the second speed reducer may be configured by the gear device 1. When the second speed reducer is configured by the gear device 1, the first arm 120 only has to be grasped as the "first member" and the second arm 130 only has to be grasped as the "second member".

In this embodiment, the motor 171 and the gear device 1 are provided in the base 110. However, the motor 171 and the gear device 1 may be provided in the first arm 120. In this case, the output shaft of the gear device 1 only has to be coupled to the base 110.

2. Gear Device 2.1. First Embodiment

A gear device according to a first embodiment is explained.

Figure 2:
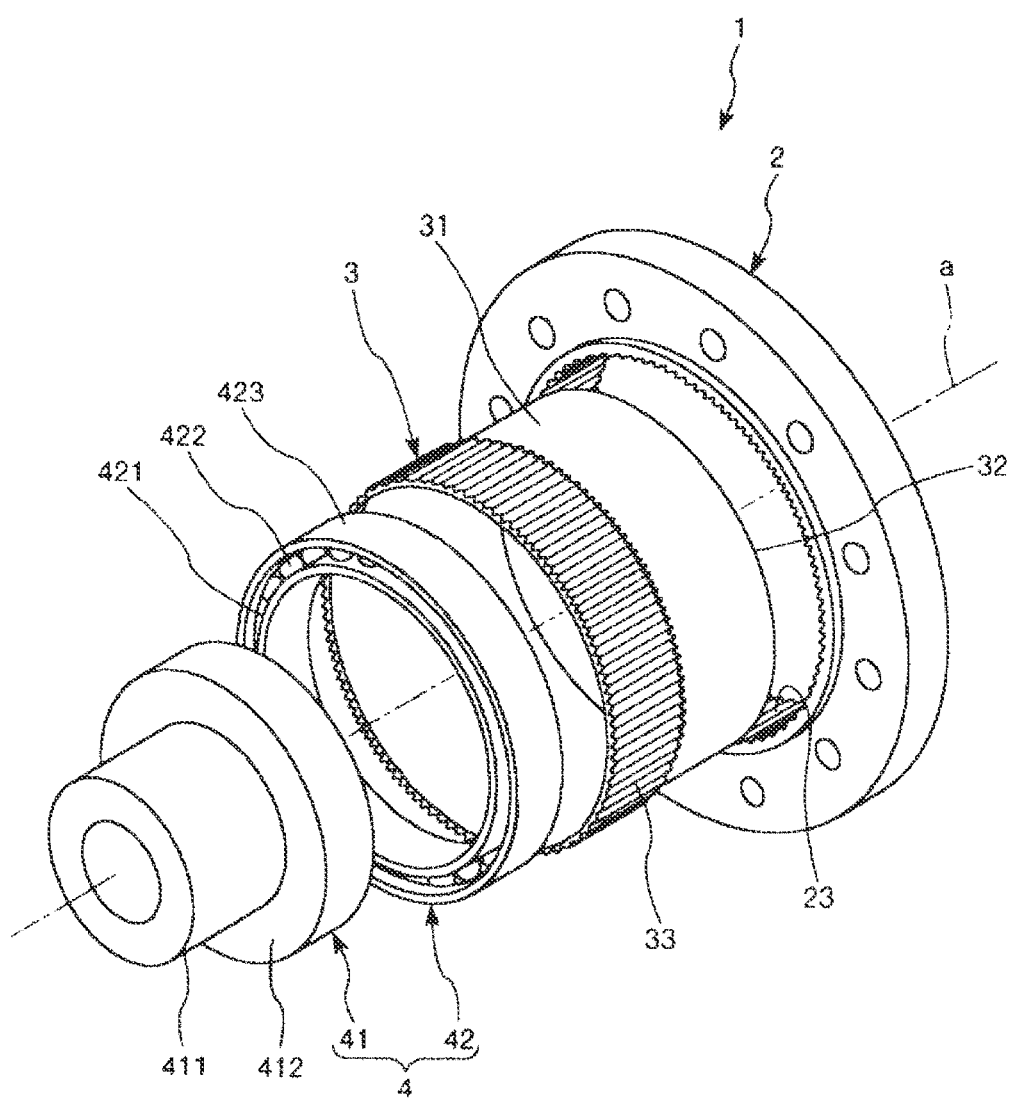
FIG. 2 is an exploded perspective view showing a gear device according to a first embodiment.
Figure 3:
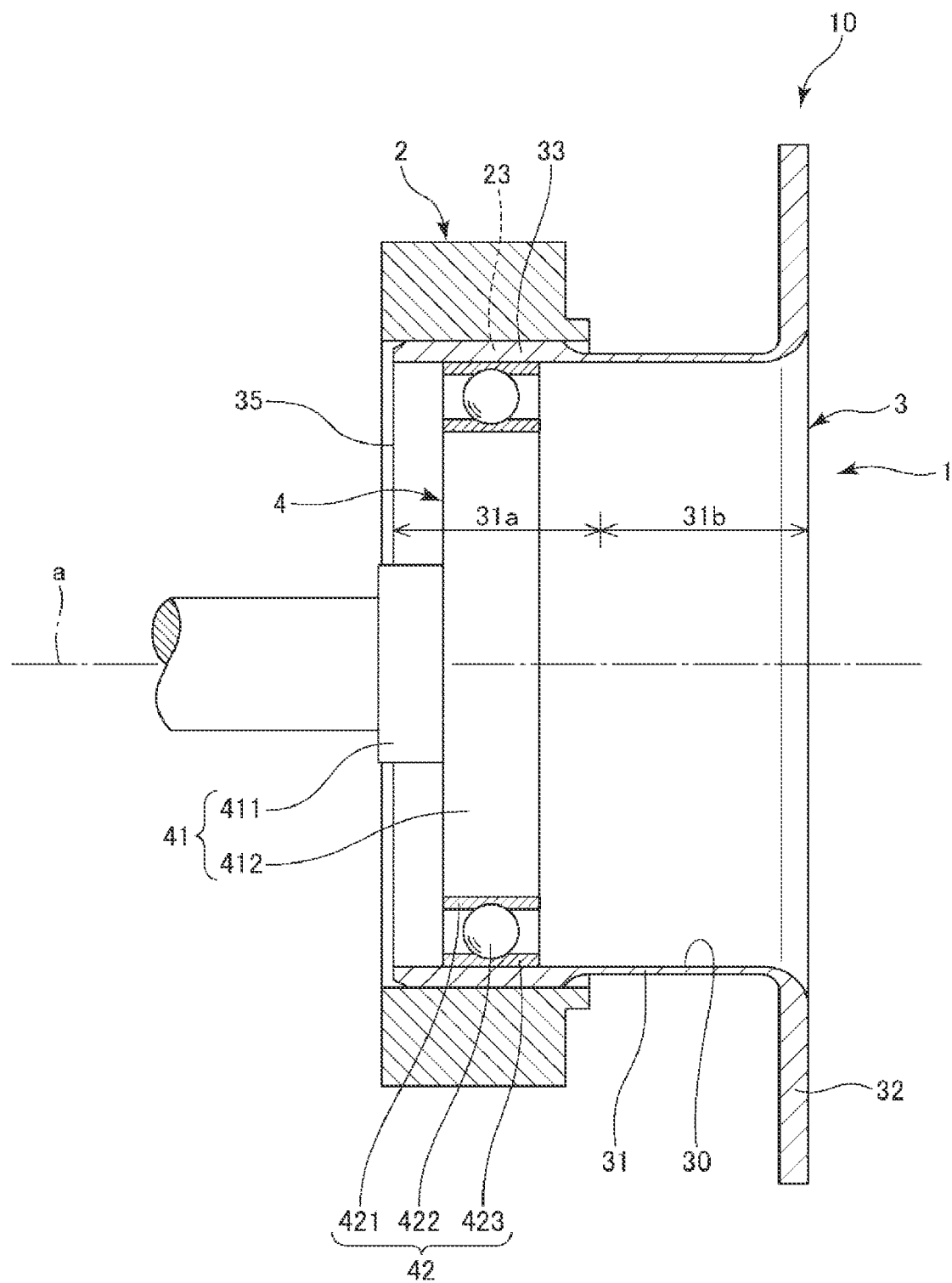
FIG. 3 is a longitudinal sectional view of the gear device shown in FIG. 2.
Figure 4:
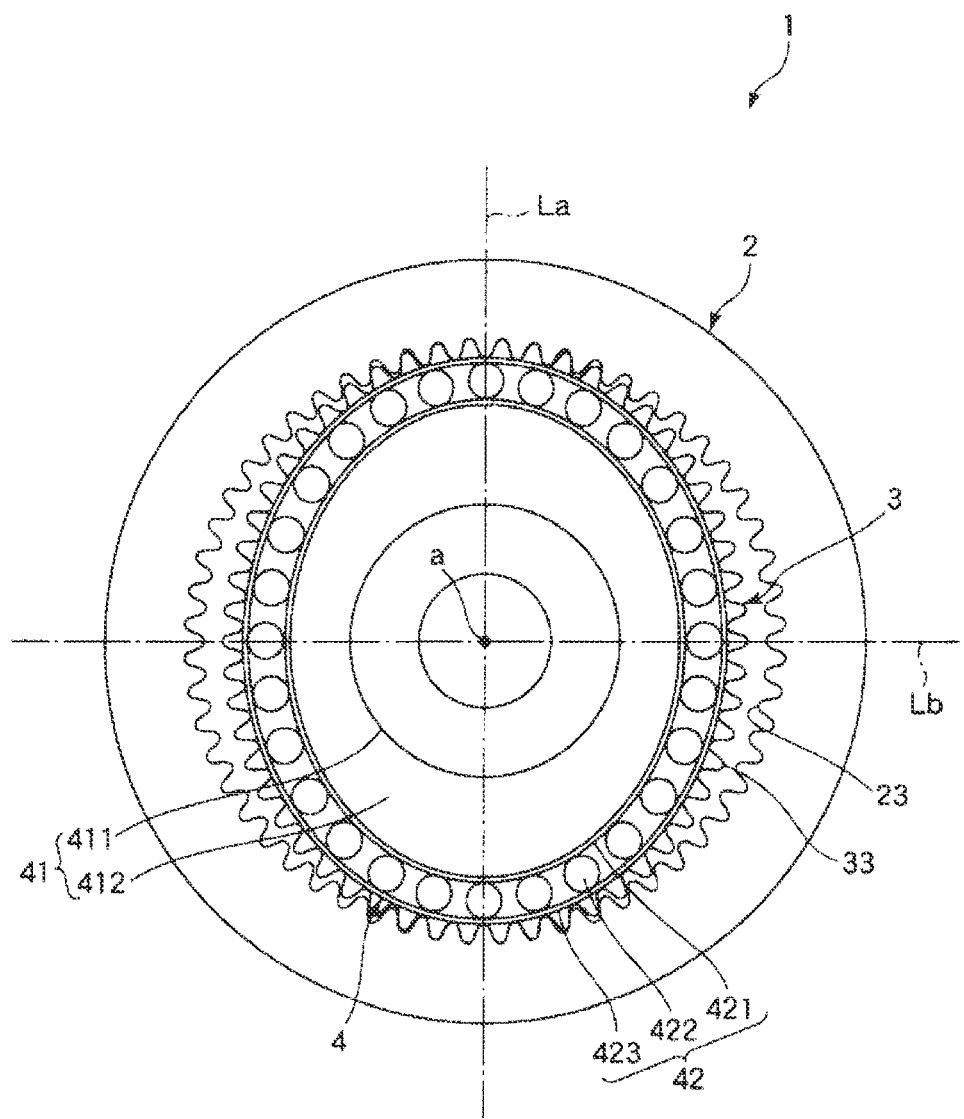
FIG. 4 is a front view of the gear device shown in FIG. 2.

FIG. 2 is an exploded perspective view showing the gear device according to the first embodiment. FIG. 3 is a longitudinal sectional view of the gear device shown in FIG. 2. FIG. 4 is a front view of the gear device shown in FIG. 2. In the figures, for convenience of explanation, dimensions of sections are exaggerated and shown as appropriate according to necessity. Dimension ratios among the sections and actual dimension ratios do not always coincide. In FIG. 2, for convenience of illustration, a part of an external gear 3, specifically, a flange section 32 is omitted.

The gear device 1 shown in FIG. 2 is a wave gear device and is used as, for example, a speed reducer. The gear device 1 includes an internal gear 2, an external gear 3 provided on the inner side of the internal gear 2, and a wave generator 4 provided on the inner side of the external gear 3 and including a bearing 42. Although not shown, a lubricant such as grease is disposed as appropriate in sections of the gear device 1, specifically, a meshing section of the internal gear 2 and the external gear 3 and a fitting section of the external gear 3 and the wave generator 4.

One of the internal gear 2, the external gear 3, and the wave generator 4 is coupled to the base 110 of the robot 100 and another one is coupled to the first arm 120 of the robot 100. In this embodiment, the internal gear 2 is fixed to the base 110, the external gear 3 is coupled to the first arm 120, and the wave generator 4 is coupled to a rotating shaft of the motor 171.

Accordingly, when the rotating shaft of the motor 171 rotates, the wave generator 4 rotates at the same rotating speed as rotating speed of the rotating shaft of the motor 171. The internal gear 2 and the external gear 3 have numbers of teeth different from each other. Therefore, a meshing position of the internal gear 2 and the external gear 3 moves in the circumferential direction. The internal gear 2 and the external gear 3 relatively rotate around the rotation axis "a"

because of the difference in the numbers of teeth. In this embodiment, since the number of teeth of the internal gear 2 is larger than the number of teeth of the external gear 3, the external gear 3 can be rotated at rotating speed lower than the rotating speed of the rotating shaft of the motor 171. That is, a speed reducer including the wave generator 4 on the input shaft side and including the external gear 3 on the output shaft side can be realized.

A coupling form of the internal gear 2, the external gear 3, and the wave generator 4 is not limited to the form explained above. For example, when the external gear 3 is fixed to the base 110 and the internal gear 2 is coupled to the first arm 120, the gear device 1 still can be used as the speed reducer. When the external gear 3 is coupled to the rotating shaft of the motor 171, the gear device 1 still can be used as the speed reducer. In this case, the wave generator 4 only has to be fixed to the base 110 and the internal gear 2 only has to be coupled to the first arm 120. When the gear device 1 is used as a speed increaser, that is, when the external gear 3 is rotated at rotating speed higher than the rotating speed of the rotating shaft of the motor 171, the relation between the input side and the output side explained above only has to be reversed.

The configuration of the gear device 1 is briefly explained below. As shown in FIGS. 2 to 4, the internal gear 2 is a gear configured by a rigid body that does not substantially bend in the radial direction and is a ring-like gear having internal teeth 23. In this embodiment, the internal gear 2 is a spur gear. Therefore, the internal teeth 23 have tooth traces parallel to the rotation axis "a". The tooth traces of the internal teeth 23 may be inclined with respect to the rotation axis "a". That is, the internal gear 2 may be a helical gear or a double-helical gear.

The external gear 3 is inserted through the inner side of the internal gear 2. The external gear 3 is a gear having flexibility deflectively deformable in the radial direction and is an external gear including external teeth 33 that mesh with the internal teeth 23 of the internal gear 2. The number of teeth of the external gear 3 is smaller than the number of teeth of the internal gear 2. Since the numbers of teeth of the external gear 3 and the internal gear 2 are different from each other in this way, a speed reducer can be realized.

In this embodiment, the external gear 3 is formed in a hat shape, that is, a brimmed cap shape including an opening 35 at the axial direction left end of FIG. 3 and includes the eternal teeth 33 provided on the outer circumferential surface of the external gear 3. The external gear 3 includes a body section 31 (a cylindrical section) formed in a cylindrical shape around the rotation axis "a". The body section 31 is divided into a first end portion 31*a*, which is a part on the opening 35 side, and a second end portion 31*b*, which is a part on the opposite side of the opening 35. The external gear 3 includes, in addition to the body section 31, a flange section 32 coupled to the second end portion 31*b*.

A ratio of the length of the body section 31 in the axial direction of the rotation axis "a" and the outer diameter of the body section 31 is not limited to a ratio shown in the figures. For example, the length of the body section 31 may be smaller than the length shown in the figures.

A not-shown output shaft is fixed to the flange section 32 of the external gear 3 by fixtures such as screws. Consequently, the output shaft and the external gear 3 are coupled. A coupling method for the output shaft and the external gear 3 is not limited to this.

As shown in FIGS. 3 and 4, the wave generator 4 is disposed on the inner side of the external gear 3 and is capable of rotating around the rotation axis "a". As shown in FIG. 4, the wave generator 4 deforms the cross section of the external gear 3 into an elliptical shape or an oval shape having a major axis La and a minor axis Lb to thereby mesh the external teeth 33 with the internal teeth 23 of the internal gear 2. The external gear 3 and the internal gear 2 are capable of rotating around the same rotation axis "a" and are meshed with each other on the inside and the outside.

As explained above, the body section 31 of the external gear 3 includes the first end portion 31*a* and the second end portion 31*b*. The first end portion 31*a* is an end portion on the opening 35 side shown in FIG. 3 and is a portion where the external teeth 33 are provided. The second end portion 31*b* is an end portion located on the flange section 32 side in the body section 31. The first end portion 31*a* is a portion where large deformation due to coning occurs. The coning means three-dimensional deformation in which the body section 31 opens to the outer side with respect to the rotation axis "a" in the position of the major axis La shown in FIG. 4 and the body section 31 narrows to the inner side with respect to the rotation axis "a" in the position of the minor axis Lb shown in FIG. 4. When the wave generator 4 is fit in the external gear 3, the first end portion 31*a* is deformed more largely than the second end portion 31*b*.

The wave generator 4 is fit in the first end portion 31*a* of the external gear 3. The wave generator 4 includes a cam 41 and a bearing 42 attached to the outer circumference of the cam 41. The cam 41 includes a shaft section 411 that rotates around the rotation axis "a" and a cam section 412 projecting to the outer side from one end portion of the shaft section 411. When viewed from a direction along the rotation axis "a", the outer circumferential surface of the cam section 412 is formed in an elliptical shape or an oval shape having the major axis La in the up-down direction in FIGS. 3 and 4. The bearing 42 is fit in the cam 41 and includes an inner ring 421 and an outer ring 423 having flexibility and a plurality of balls 422 disposed between the inner ring 421 and the outer ring 423.

The inner ring 421 is fit in the outer circumferential surface of the cam section 412 of the cam 41 and is elastically deformed in an elliptical shape or an oval shape along the outer circumferential surface of the cam section 412. According to the elastic deformation of the inner ring 421, the outer ring 423 is also elastically deformed in an elliptical shape or an oval shape. As shown in FIG. 3, the outer circumferential surface of the outer ring 423 is in contact with an inner circumferential surface 30 of the body section 31. The plurality of balls 422 are held by a not-shown holder to keep intervals among the plurality of balls 422 in the circumferential direction of the inner ring 421 constant.

Such a wave generator 4 changes the direction of the cam section 412 according to rotation of the cam 41 around the rotation axis "a" and deforms the outer ring 423 according to the change of the direction of the cam section 412. Consequently, the wave generator 4 moves the meshing position of the internal gear 2 and the external gear 3 in the circumferential direction. At this time, since the inner ring 421 is fixedly set on the outer circumferential surface of the cam section 412, a deformed state of the inner ring 421 does not change.

Figure 5:
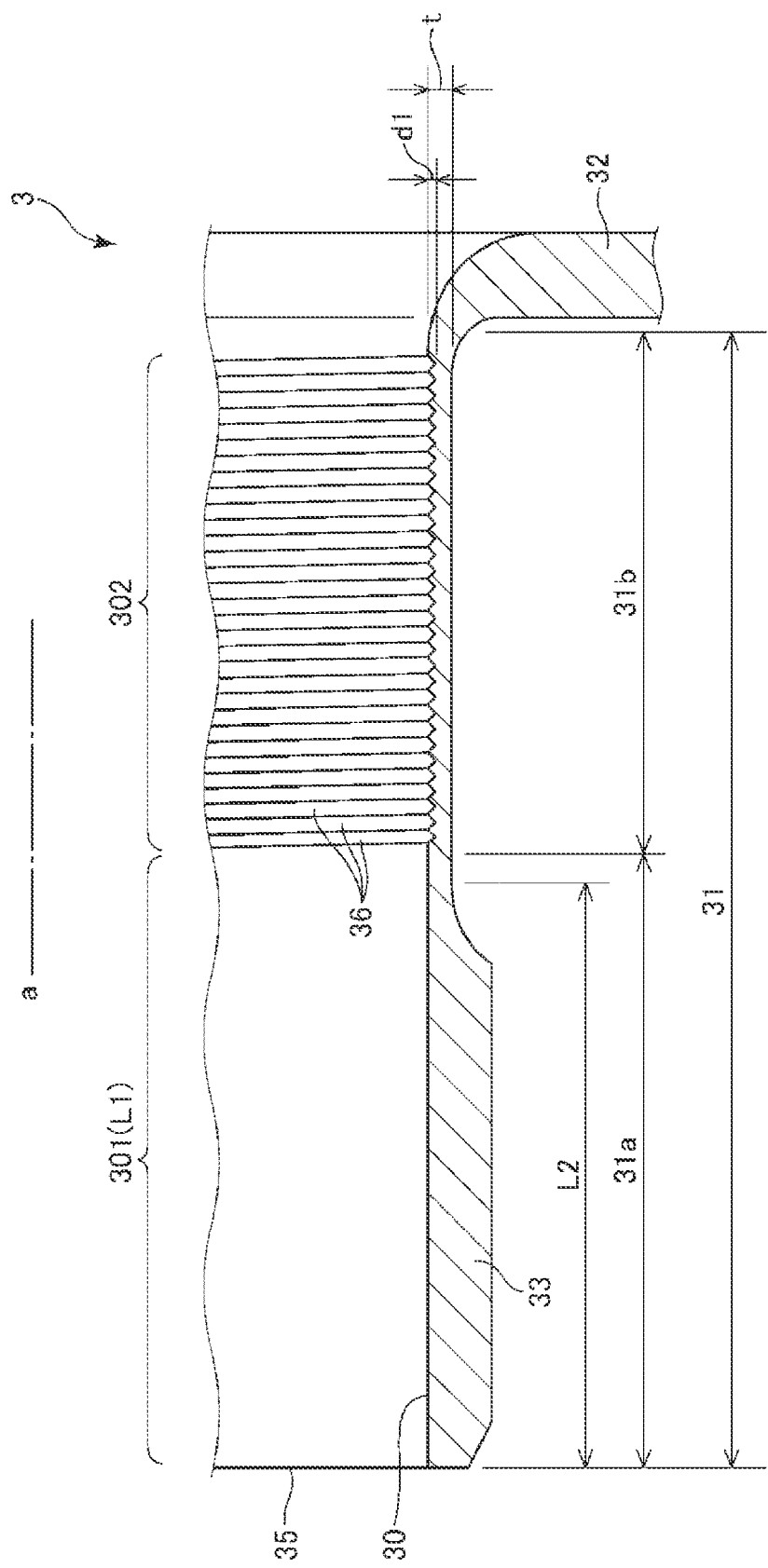
FIG. 5 is a diagram showing only an external gear shown in FIG. 3 in detail.

FIG. 5 is a diagram showing only the external gear 3 shown in FIG. 3 in detail.

As explained above, the body section 31 of the external gear 3 shown in FIG. 5 includes the first end portion 31*a* and the second end portion 31*b*. The body section 31 is formed in the cylindrical shape as explained above and has the inner circumferential surface 30.

A portion of the inner circumferential surface 30 corresponding to the first end portion 31a includes a polished surface 301. The polished surface 301 refers to a machined surface to which polishing is applied. As an example, an entire portion of the inner circumferential surface 30 corresponding to the first end portion 31a shown in FIG. 5 is the polished surface 301 and is a flat surface. However, the polished surface 301 does not need to be the flat surface and, as explained below, may be a surface including any machined marks. The portion of the inner circumferential surface 30 corresponding to the first end portion 31a may include a surface other than the polished surface 301.

The polishing is machining for bringing a polishing agent or a polishing tool into contact with the inner circumferential surface 30 of the body section 31 and applying physical polishing or chemical polishing to the inner circumferential surface 30. The polished surface 301 has surface roughness smaller than the surface roughness of a machined surface. In that point of view, the polished surface 301 can be distinguished from the machined surface. A foundation, that is, a surface before application of polishing of the polished surface 301 is not particularly limited and may be any machined surface.

On the other hand, a portion of the inner circumferential surface 30 corresponding to the second end portion 31b includes a lathe-cut surface 302. The lathe-cut surface 302 refers to a machined surface to which cutting by a lath is applied. As an example, first circumferential grooves 36, which are machining marks, are distributed on the entire portion of the inner circumferential surface 30 corresponding to the second end portion 31b shown in FIG. 5.

The cutting by the lathe refers to machining for rotating the external gear 3 around the rotation axis "a" and cutting the inner circumferential surface 30 with a tool. Since cutting marks remain on a machined surface, it is possible to distinguish the machined surface and the polished surface 301.

Since the portion of the inner circumferential surface 30 corresponding to the second end portion 31b includes the lathe-cut surface 302, residual stress due to machining is larger than residual stress of the polished surface 301. Accordingly, the lathe-cut surface 302 contributes to an increase in the rigidity of the second end portion 31b. Consequently, at the second end portion 31b, it is possible to increase deformation resistance at the time when the second end portion 31b is twisted around the rotation axis "a". If the second end portion 31b is easily deformed, a phase of an output of the gear device 1 easily delays with respect to an input of the gear device 1. Therefore, by increasing the deformation resistance of the second end portion 31b, it is possible to suppress a shift of the output phase in the gear device 1. It is possible to realize the gear device 1 excellent in responsiveness.

The entire portion of the inner circumferential surface 30 corresponding to the second end portion 31b shown in FIG. 5 is the lathe-cut surface 302. However, the portion may include a surface other than the lathe-cut surface 302.

On the other hand, on the polished surface 301, residual stress due to machining is smaller than the residual stress on the lathe-cut surface 302. This is because the residual stress is reduced by the polishing. A decrease in surface roughness due to the polishing also affects the residual stress. On the polished surface 301, it is possible to relatively reduce fatigue fracture involved in coning. Consequently, it is possible to extend the life of the external gear 3.

As explained above, the gear device 1 according to this embodiment includes the internal gear 2, the external gear 3, and the wave generator 4. The external gear 3 has flexibility and partially meshes with the internal gear 2 and rotates around the rotation axis "a" relatively to the internal gear 2. The wave generator 4 comes into contact with the inner circumferential surface 30 of the body section 31 of the external gear 3 and moves the meshing position of the internal gear 2 and the external gear 3 in the circumferential direction around the rotation axis "a".

The external gear 3 includes the body section 31 (the cylindrical section) including the first end portion 31a where the wave generator 4 is in contact with the inner circumferential surface 30 and the second end portion 31b adjacent to the first end portion 31a along the rotation axis "a". The inner circumferential surface 30 of the first end portion 31a includes the polished surface 301. The inner circumferential surface 30 of the second end portion 31b includes the lathe-cut surface 302.

With such a configuration, fatigue fracture is suppressed at the first end portion 31a including the polished surface 301 with which the wave generator 4 is in contact. Accordingly, extension of the life of the external gear 3 is achieved. At the second end portion 31b, the deformation resistance is increased by the lathe-cut surface 302. Accordingly, it is possible to suppress a shift of the output phase in the gear device 1. Therefore, the external gear 3 including the inner circumferential surface including the polished surface 301 and the lathe-cut surface 302 can realize the gear device 1 that achieves both of the extension of the life and the suppression of the shift of the output phase.

The robot 100 includes the base 110, which is the first member, the first arm 120, which is the second member that turns with respect to the base 110, the gear device 1 that transmits a driving force for rotating the first arm 120 relatively to the base 110, and the motor 171, which is the driving source that outputs a driving force to the gear device 1.

With such a configuration, since extension of the life and improvement of the responsiveness of the gear device 1 are achieved, it is possible to realize the robot 100 having a high driving ability for which labor and time for maintenance are reduced.

As explained above, the external gear 3 includes the external teeth 33 provided at the first end portion 31a. As shown in FIG. 5, the external teeth 33 includes tooth traces parallel to the rotation axis "a". Further, the length of the polished surface 301 in the axial direction of the rotation axis "a", specifically, length L1 of the polished surface 301 shown in FIG. 5 is set to be larger than length L2 of the external teeth 33 in the axial direction.

By setting the length L1 of the polished surface 301 larger than the length L2 of the external teeth 33, the polished surface 301 is disposed to sufficiently cover the external teeth 33. In the external teeth 33, fatigue fracture easily occurs in, for example, a position of a tooth bottom. However, since the polished surface 301 is set on the rear surface side of the external teeth 33, it is possible to reduce a probability of occurrence of fatigue fracture. Consequently, it is possible to achieve further extension of the life of the gear device 1.

In order to obtain the effects described above, the length L1 of the polished surface 301 only has to be larger than the length L2 of the external teeth 33. However, a ratio L1/L2 is preferably 1.0 or more and 1.50 or less and more preferably 1.05 or more and 1.30 or less. Consequently, it is possible to further reduce the probability of occurrence of fatigue fracture of the external gear 3 while preventing the lathe-cut surface 302 from becoming narrow.

As explained above, the lathe-cut surface 302 includes the cutting traces. The cutting traces are formed when a tool comes into contact with the external gear 3 rotated by a lathe. Accordingly, the cutting traces are grooves extending in the circumferential direction around the rotation axis "a". The lathe-cut surface 302 shown in FIG. 5 includes the first circumferential grooves 36 extending in the circumferential direction around the rotation axis "a". The first circumferential grooves 36 are formed in a spiral shape.

With such a configuration, the first circumferential grooves 36, which are the cutting traces, are evenly formed in the circumferential direction. Accordingly, residual stress involved in the first circumferential grooves 36 is evenly distributed in the circumferential direction. Therefore, it is possible to uniformly increase rigidity in the circumferential direction. As a result, it is possible to particularly increase the deformation resistance of the second end portion 31b. It is possible to particularly suppress a shift of the output phase in the gear device 1.

As explained above, the first circumferential grooves 36 shown in FIG. 5 extend in the circumferential direction and are formed in the spiral shape. Examples of a cross sectional shape of the first circumferential grooves 36 include, besides a triangle shown in FIG. 5, a polygon such as a square or a pentagon, a partially curved shape, and other deformed shapes.

When the first circumferential grooves 36 are formed in the spiral shape, in the sectional view shown in FIG. 5, the first circumferential grooves 36 adjacent to one another are coupled to one another on the paper surface depth side or the near side of FIG. 5. However, it is not essential that the first circumferential grooves 36 are formed in the spiral shape. The first circumferential grooves 36 may be an aggregate of a plurality of grooves forming a closed annular shape and independent from one another.

The first circumferential grooves 36 adjacent to one another in FIG. 5 may be in contact with one another as shown in FIG. 5 or may be separated from one another. Even when the first circumferential grooves 36 are separated from one another, an area occupied by the first circumferential grooves 36 in the lathe-cut surface 302 is preferably larger than an area occupied by gaps among the first circumferential grooves 36.

Depth d1 of the first circumferential grooves 36 shown in FIG. 5 is not particularly limited. However, as an example, the depth d1 is preferably 0.01 μm or more and 30 μm or less and more preferably 0.10 μm or more and 10 μm or less. Consequently, it is possible to increase the deformation resistance of the second end portion 31b while suppressing deterioration in mechanical strength involved in provision of the first circumferential grooves 36. As a result, it is possible to improve the responsiveness while suppressing a decrease in allowable torque of the gear device 1.

The depth d1 of the first circumferential grooves 36 may be uniform on the entire lathe-cut surface 302 or may be partially different.

Thickness t of the body section 31 is not particularly limited. However, as an example, the thickness t is preferably 0.1 mm or more and 3.0 mm or les and more preferably 0.2 mm or more and 2.0 mm or less. Consequently, even when the first circumferential grooves 36 are provided, it is possible to achieve both of the mechanical strength and the deformation resistance of the second end portion 31b and it is possible to secure easy deformability of the first end portion 31a. As a result, it is possible to achieve further extension of the life and further improvement of the responsiveness of the gear device 1.

2.2. Second Embodiment

A gear device according to a second embodiment is explained.

Figure 6:
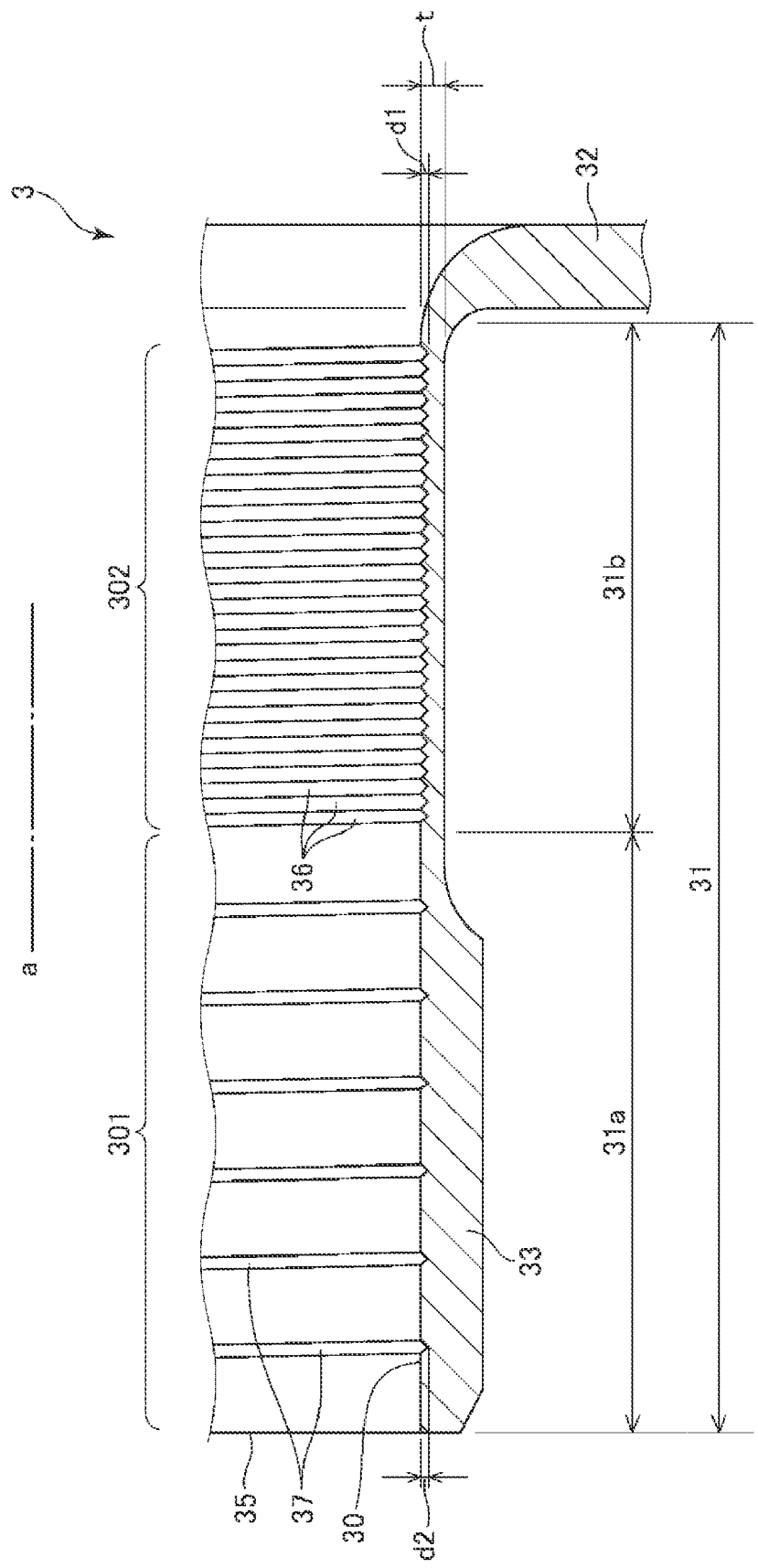
FIG. 6 is a sectional view showing the inner circumferential surface of an external gear included in a gear device according to a second embodiment.

FIG. 6 is a sectional view showing the inner circumferential surface of an external gear included in the gear device according to the second embodiment.

The second embodiment is explained below. In the following explanation, differences from the first embodiment are mainly explained and explanation about similarities to the first embodiment is omitted. In FIG. 6, the same components as the components in the first embodiment are denoted by the same reference numerals and signs.

In the first embodiment explained above, as shown in FIG. 5, the polished surface 301 is the flat surface. On the other hand, in this embodiment, as shown in FIG. 6, the polished surface 301 includes second circumferential grooves 37 extending in the circumferential direction around the rotation axis "a".

The second circumferential grooves 37 are grooves remaining after polishing is applied to a surface originally including circumferential grooves. That is, the second circumferential grooves 37 are circumferential grooves that are left without disappearing even after the polishing. For example, after circumferential grooves are machined on the entire inner circumferential surface 30, when polishing is applied to only a portion corresponding to the first end portion 31a, the original circumferential grooves directly remain as the first circumferential grooves 36 in the portion of the inner circumferential surface 30 corresponding to the second end portion 31b. On the other hand, polishing is applied to the original circumferential grooves in the portion of the inner circumferential surface 30 corresponding to the first end portion 31a. A part of the circumferential grooves remain to be the second circumferential grooves 37. Therefore, the depth of the second circumferential grooves 37 formed by such a method is smaller than the depth of the first circumferential grooves 36. However, in FIG. 6, for convenience of illustration, a significant difference is not set between the depth of the first circumferential grooves 36 and the depth of the second circumferential grooves 37.

Even with the polished surface 301 on which the second circumferential grooves 37 remain in this way, it is possible to enjoy the effect of the decrease in the residual stress through the polishing. Accordingly, even if the second circumferential grooves 37 are included in the polished surface 301, it is possible to reduce the probability of occurrence of fatigue fracture in the first end portion 31a. As a result, in the second embodiment, the same effects as the effects in the first embodiment are obtained.

Since a lubricant easily accumulates in the second circumferential grooves 37, the second circumferential grooves 37 have action of retaining the lubricant. Therefore, the lubricant is easily retained on the polished surface 301 including the second circumferential grooves 37. It is possible to improve lubricity between the polished surface 301 and the wave generator 4. As a result, it is possible to prevent burn-in from occurring between the external gear 3 and the wave generator 4.

Depth d2 of the second circumferential grooves 37 shown in FIG. 6 is not particularly limited. However, as an example, the depth d2 is preferably 95% or less of the depth d1 of the first circumferential grooves 36 and more preferably 1% or more and 60% or less of the depth d1 of the first circumferential grooves 36. Consequently, it is possible to optimize the depth d2 of the second circumferential grooves 37. It is possible to improve retention of the lubricant without greatly increasing the probability of fatigue fracture of the external gear 3.

The second circumferential grooves 37 shown in FIG. extend in the circumferential direction around the rotation axis "a" and is formed in, for example, a spiral shape. Examples of a cross sectional shape of the second circumferential grooves 37 include, besides a triangle shown in FIG. 6, a polygon such as a square or a pentagon, a partially curved shape, and other deformed shapes.

The second circumferential grooves 37 adjacent to one another are separated from one another as shown in FIG. 6. An area occupied by the second circumferential grooves 37 in the polished surface 301 is preferably smaller than an area occupied by gaps among the second circumferential grooves 37.

2.3. Third Embodiment

A gear device according to a third embodiment is explained.

Figure 7:
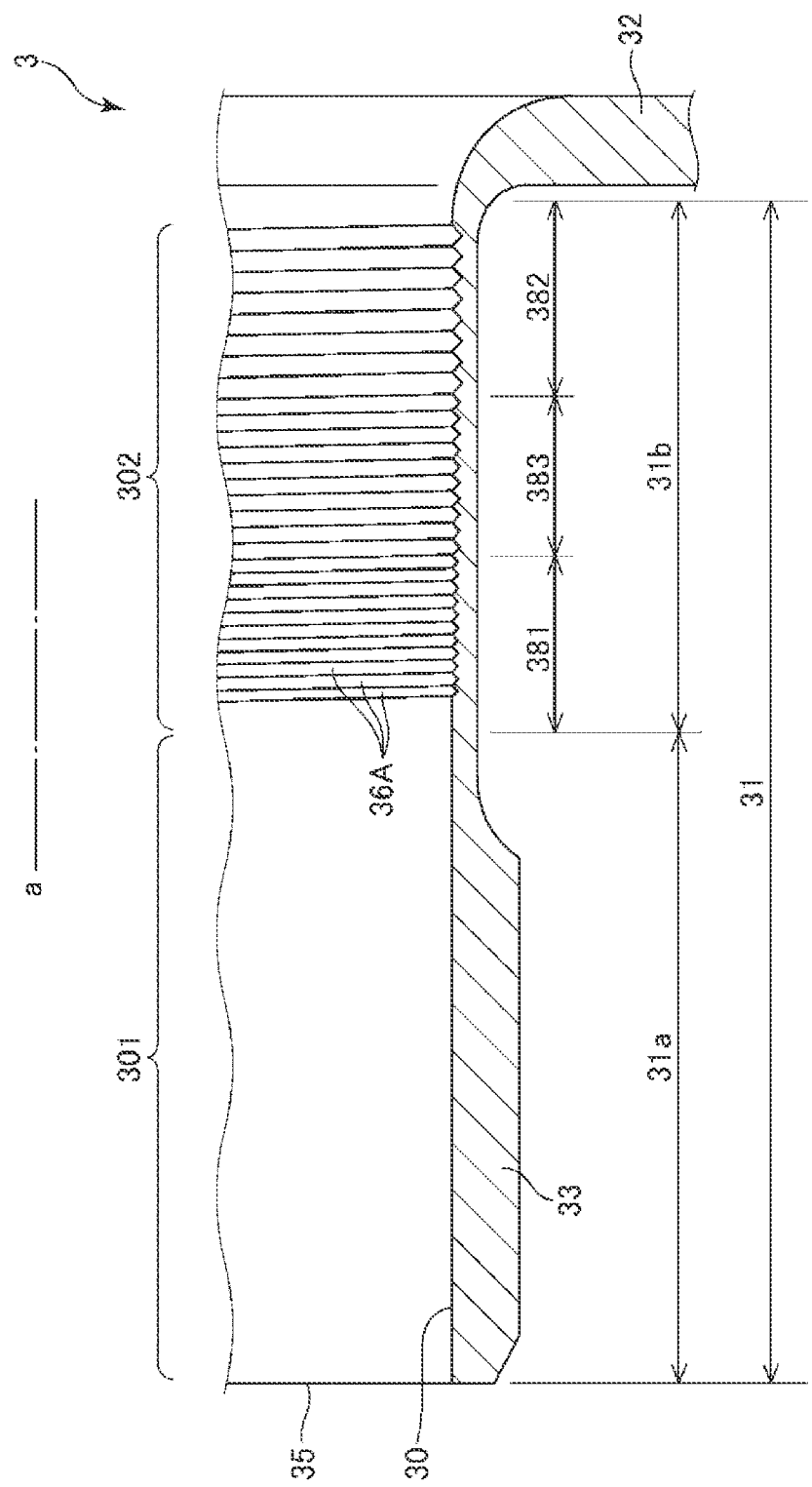
FIG. 7 is a sectional view showing the inner circumferential surface of an external gear included in a gear device according to a third embodiment.

FIG. 7 is a sectional view showing the inner circumferential surface of an external gear included in the gear device according to the third embodiment.

The third embodiment is explained below. In the following explanation, differences from the second embodiment are mainly explained. Explanation about similarities to the second embodiment is omitted. In FIG. 7, the same components as the components in the first embodiment are denoted by the same reference numerals and signs.

The lathe-cut surface 302 shown in FIG. 7 includes first circumferential grooves 36A.

In the first embodiment explained above, the depth of the first circumferential grooves 36 is uniform on the entire lathe-cut surface 302. In contrast, in this embodiment, the depth of the first circumferential grooves 36A is partially different.

The first circumferential grooves 36A are distributed in an entire portion of the inner circumferential surface 30 shown in FIG. 7 corresponding to the second end portion 31b. The depth of the first circumferential grooves 36A is larger in a region separated from the polished surface 301, that is, a region 382 shown in FIG. 7 than in a region close to the polished surface 301, that is, a region 381 shown in FIG. 7 on the lathe-cut surface 302.

By partially differentiating the depth of the first circumferential grooves 36A in such a pattern, residual stress larger than residual stress in the region 381 occurs in the region 382. Accordingly, at the second end portion 31b of the body section 31, it is possible to further increase deformation resistance of a portion close to the flange section 32. As a result, it is possible to further improve the responsiveness of the gear device 1. On the other hand, although a deformation amount involved in coning is larger in the region 381 than in the region 382, since the residual stress is smaller in the region 381, it is possible to reduce a probability of occurrence of fatigue fracture.

The minimum depth of the first circumferential grooves 36A is preferably 1% or more and 90% or less of the maximum depth of the first circumferential grooves 36A and is more preferably 5% or more and 70% or less of the maximum depth of the first circumferential grooves 36A. If the minimum depth of the first circumferential grooves 36A is in this range, it is possible to develop the additional action explained above without spoiling the original action of the first circumferential grooves 36A.

The depth of the first circumferential grooves 36A may suddenly change but preferably gradually changes. For example, as shown in FIG. 7, in a region 383 located between the region 381 and the region 382, the depth of the first circumferential grooves 36A is preferably depth between the depth of the first circumferential grooves 36A in the region 381 and the depth of the first circumferential grooves 36A in the region 382. Consequently, the effects described above are more conspicuous.

In the third embodiment explained above, the same effects as the effects in the first embodiment are obtained.

2.4. Fourth Embodiment

A gear device according to a fourth embodiment is explained.

Figure 8:
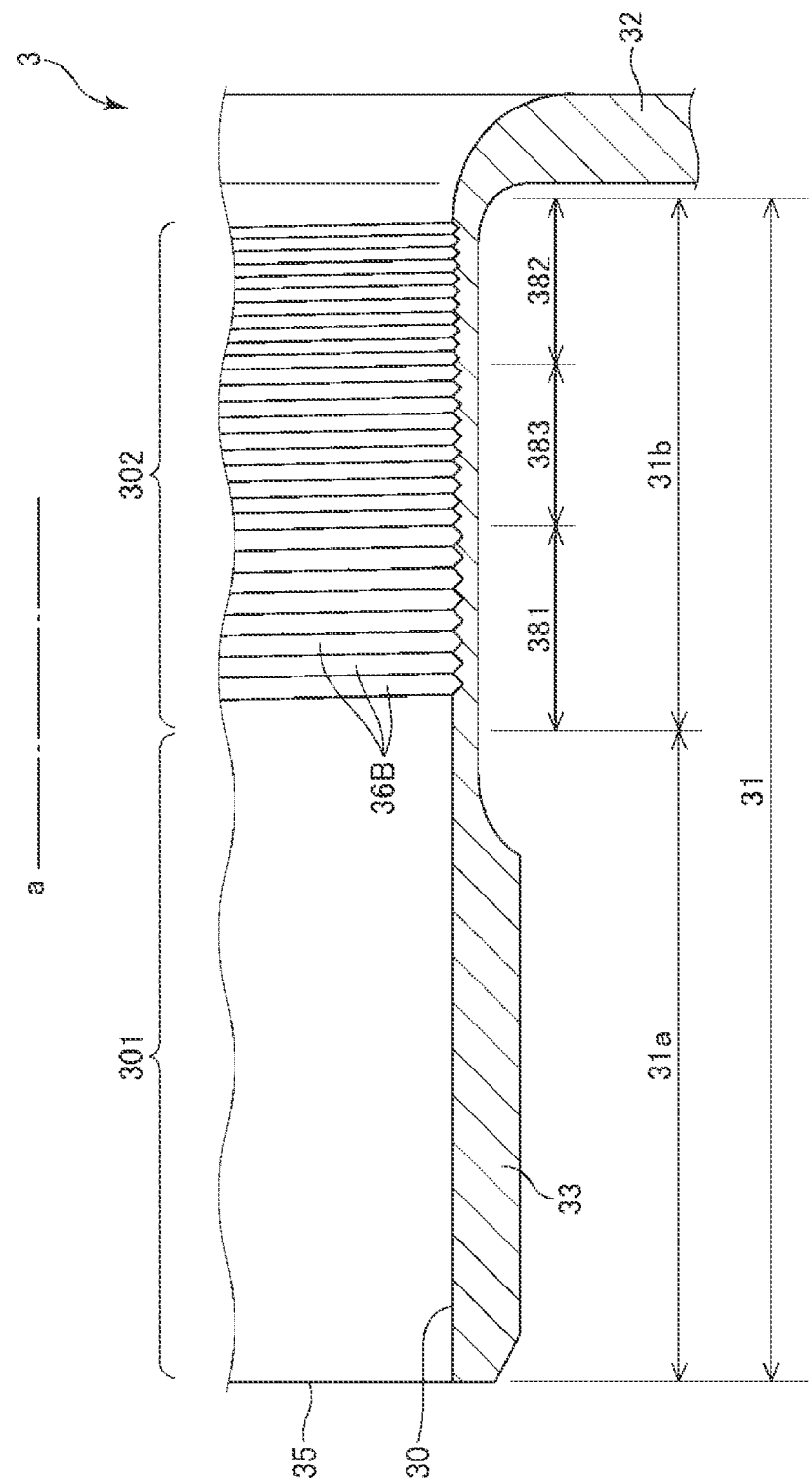
FIG. 8 is a sectional view showing the inner circumferential surface of an external gear included in a gear device according to a fourth embodiment.

FIG. 8 is a sectional view showing the inner circumferential surface of an external gear included in the gear device according to the fourth embodiment.

The fourth embodiment is explained below. In the following explanation, differences from the third embodiment are mainly explained. Explanation about similarities to the third embodiment is omitted. In FIG. 8, the same components as the components in the third embodiment are denoted by the same reference numerals and signs.

In the third embodiment explained above, as shown in FIG. 7, the depth of the first circumferential grooves 36A is larger in the region 382 separated from the polished surface 301 than in the region 381 close to the polished surface 301 on the lathe-cut surface 302.

In contrast, in this embodiment, as shown in FIG. 8, the depth of first circumferential grooves 36B is smaller in a region separated from the polished surface 301, that is, the region 382 shown in FIG. 8 than in a region close to the polished surface 301, that is, the region 381 shown in FIG. 8 on the lathe-cut surface 302.

By partially differentiating the depth of the first circumferential grooves 36B in such a pattern, retention of a lubricant is higher in the region 381 than in the region 382. That is, in the region 381, since the depth of the first circumferential grooves 36B is larger than in the region 382, fluidity of the lubricant is suppressed. A larger amount of the lubricant is easily regained. Accordingly, the lubricant retained in the region 381 can be continuously supplied for a long period to a contact point of the external gear 3 and the wave generator 4. Consequently, it is possible to achieve further extension of the life of the gear device 1.

The minimum depth of the first circumferential grooves 36B is preferably 1% or more and 90% or less of the maximum depth of the first circumferential grooves 36B and more preferably 5% or more and 70% or less of the maximum depth of the first circumferential grooves 36B. If the minimum depth of the first circumferential grooves 36B is in this range, it is possible to develop the additional action explained above without spoiling the original action of the first circumferential grooves 36B.

The depth of the first circumferential grooves 36B may suddenly change but preferably gradually changes. For example, as shown in FIG. 8, in the region 383 located between the region 381 and the region 382, the depth of the first circumferential grooves 36B is preferably depth between the depth of the first circumferential grooves 36B in the region 381 and the depth of the first circumferential grooves 36B in the region 382. Consequently, the effects described above are more conspicuous.

In the fourth embodiment explained above, the same effects as the effects in the first embodiment are obtained.

2.5. Fifth Embodiment

A gear device according to a fifth embodiment is explained.

Figure 9:
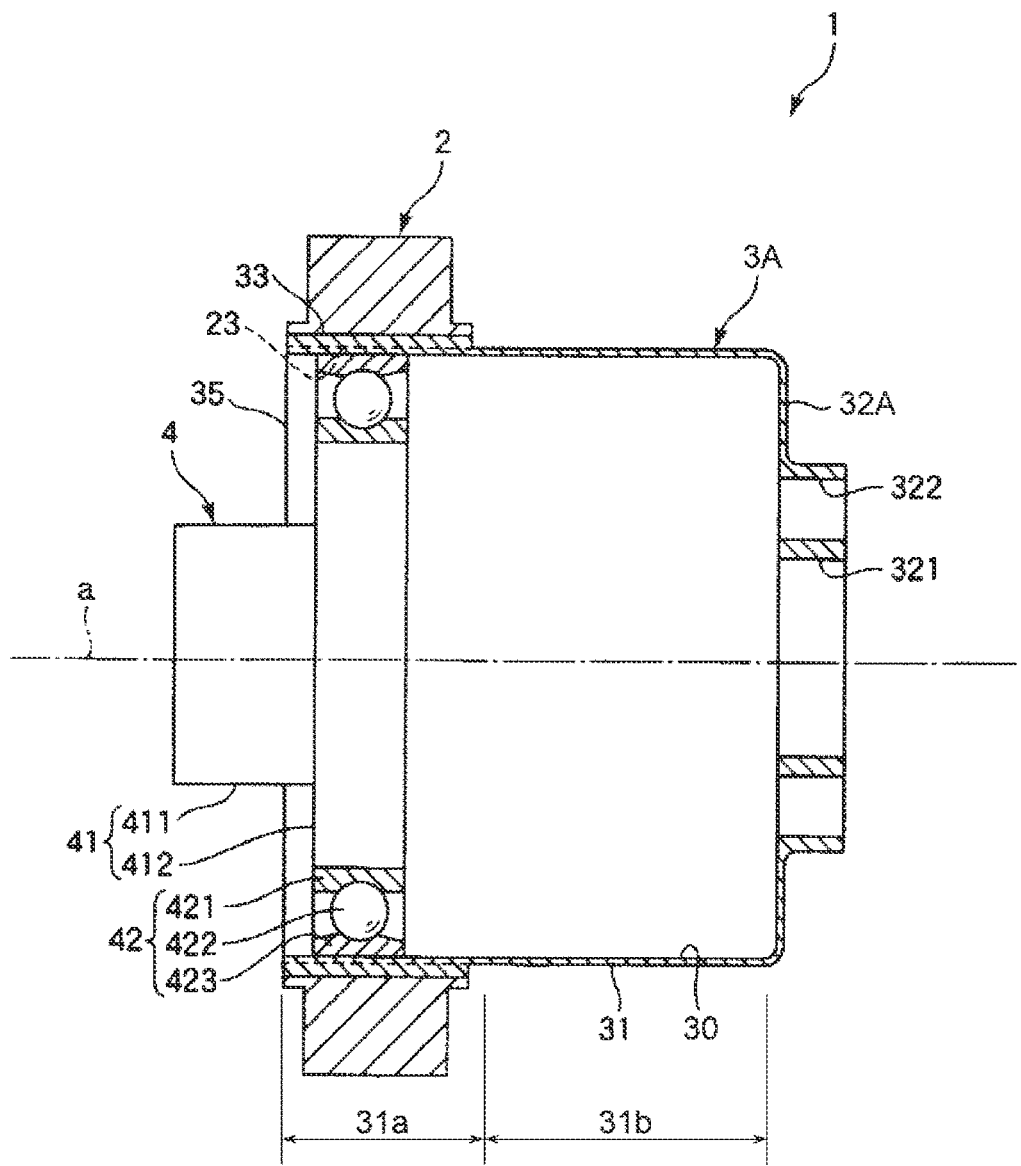
FIG. 9 is a longitudinal sectional view of a gear device according to a fifth embodiment.

FIG. 9 is a longitudinal sectional view of the gear device according to the fifth embodiment.

The fifth embodiment is explained below. In the following explanation, differences from the first embodiment are mainly explained and explanation about similarities to the first embodiment is omitted. In FIG. 9, the same components as the components in the first embodiment are denoted by the same reference numerals and signs.

This embodiment is the same as the first embodiment except that the shape of an external gear 3A is different.

The external gear 3A shown in FIG. 9 is formed in a cup shape including the opening 35 at the axial direction left side in FIG. 9 and includes the external teeth 33 provided on the outer circumferential surface of the external gear 3A. The external gear 3A shown in FIG. 9 includes the body section 31 and a bottom section 32A coupled to the second end portion 31*b* of the body section 31.

A ratio of the length of the body section 31 in the axial direction of the rotation axis "a" and the outer diameter of the body section 31 is not limited to a ratio shown in the figures. For example, the length of the body section 31 may be smaller than the length shown in the figures.

As shown in FIG. 9, in the bottom section 32A of the external gear 3A, a hole 321 piercing through the bottom section 32A along the rotation axis "a" and a plurality of holes 322 piercing through the bottom section 32A around the hole 321 are formed. An output shaft can be inserted through the hole 321. The holes 322 are used as screw holes through which screws or the like for fixing the output shaft to the bottom section 32A are inserted. The holes 321 and 322 only have to be provided as appropriate and may be omitted. A coupling method for the output shaft and the external gear 3A is not limited to this.

The body section 31 of the external gear 3A explained above has the same configuration as the configuration of the body section 31 of the external gear 3 according to the first embodiment. Therefore, in this embodiment, the same effects as the effects in the first embodiment are obtained.

The gear device and the robot according to the present disclosure are explained above based on the illustrated embodiments. However, the present disclosure is not limited to the embodiments. The components of the sections in the embodiments can be replaced with any components having the same functions. Any other components may be added to the embodiments.

In the embodiments explained above, the gear device in which the base included in the robot is the "first member" and the first arm included in the robot is the "second member" and a driving force is transmitted from the first member to the second member is explained. However, the present disclosure is not limited to this. The present disclosure is also applicable to a gear device in which an n-th arm is the "first member" and a (n+1)-th arm is the "second member" and a driving force is transmitted from one to the other of the n-th arm and the (n+1)-th arm. Note that n is an integer equal to or larger than 1. The present disclosure is also applicable to a gear device in which a driving force is transmitted from the second member to the first member.

In the embodiments explained above, a horizontal articulated robot is explained. However, the robot according to the present disclosure is not limited to this. For example, the number of joints of the robot is optional. The present disclosure is also applicable to a vertical articulated robot.

Further, in the embodiments explained above, an example is explained in which the gear device is incorporated in the robot. However, the gear device according to the present disclosure can also be incorporated and used in various apparatuses having a configuration in which a driving force is transmitted from a first member to a second member that turn with respect to each other.

Example

A specific example of the present disclosure is explained below.

3. Manufacturing of a Gear Device

3.1. Example

First, a gear device having the structure shown in FIG. 2 and satisfying the following conditions was manufactured.
Outer diameter of an internal gear: 60 mm
Outer diameter of an external gear: 43 mm
Reduction ratio: 50
Inner circumferential surface of a first end portion: polished surface
Inner circumferential surface of a second end portion: lathe-cut surface

3.2. Comparative Example 1

A gear device was manufactured in the same manner as in the example except that the following conditions were different.
Inner circumferential surface of a first end portion: lathe-cut surface
Inner circumferential surface of a second end portion: lathe-cut surface

3.3. Comparative Example 2

A gear device was manufactured in the same manner as in the example except that the following conditions were different.
Inner circumferential surface of a first end portion: polished surface
Inner circumferential surface of a second end portion: polished surface

4. Evaluation of the Gear Devices

4.1. Life

Subsequently, torque was input to the gear devices of the example and the comparative example 1 and the lives of the gear devices were calculated. A specific measuring method for the lives is as explained below.

First, torque was input to input shafts of the gear devices at the number of revolutions of 3000 rpm, average load torque of 50 Nm, and a peak torque of 60 Nm and continuous operation was performed. Subsequently, the numbers of revolutions of the input shafts were counted until the gear devices were broken. The numbers of revolutions calculated in this way were set as the lives of the gear devices.

Figure 10:
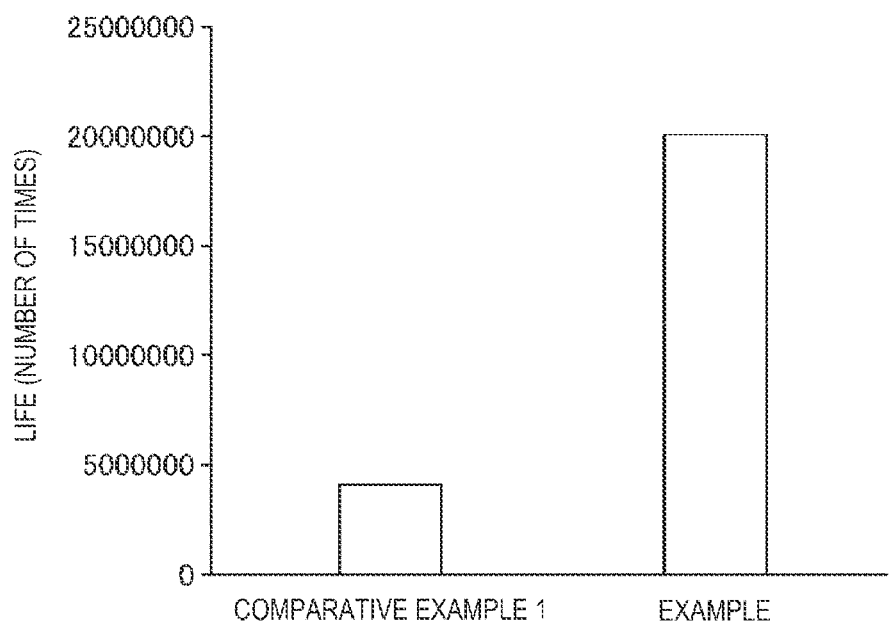
FIG. 10 is a graph showing a relation between torque input to gear devices and the life of the gear devices in an example and a comparative example.

An evaluation result is shown in FIG. 10. As it is evident from the evaluation result shown in FIG. 10, it was recognized that the life of the gear device of the example is longer than the life of the gear device of the comparative example 1.

4.2. Responsiveness

Subsequently, responsiveness of the gear devices of the example and the comparative examples was evaluated as explained below.

First, the input shafts of the gear devices were fixed. Subsequently, the output shafts were rotated and torques generated in the input shafts and rotation angles of the output shafts corresponding to the torques were respectively calculated.

Subsequently, shifts between phases of the torques generated in the input shafts and phases of rotations of the output shafts were calculated. Measurement results were plotted on a coordinate system having toque on the horizontal axis and having a shift of a phase on the vertical axis and a graph was created. The obtained graph is shown in FIG. 11.

Figure 11:
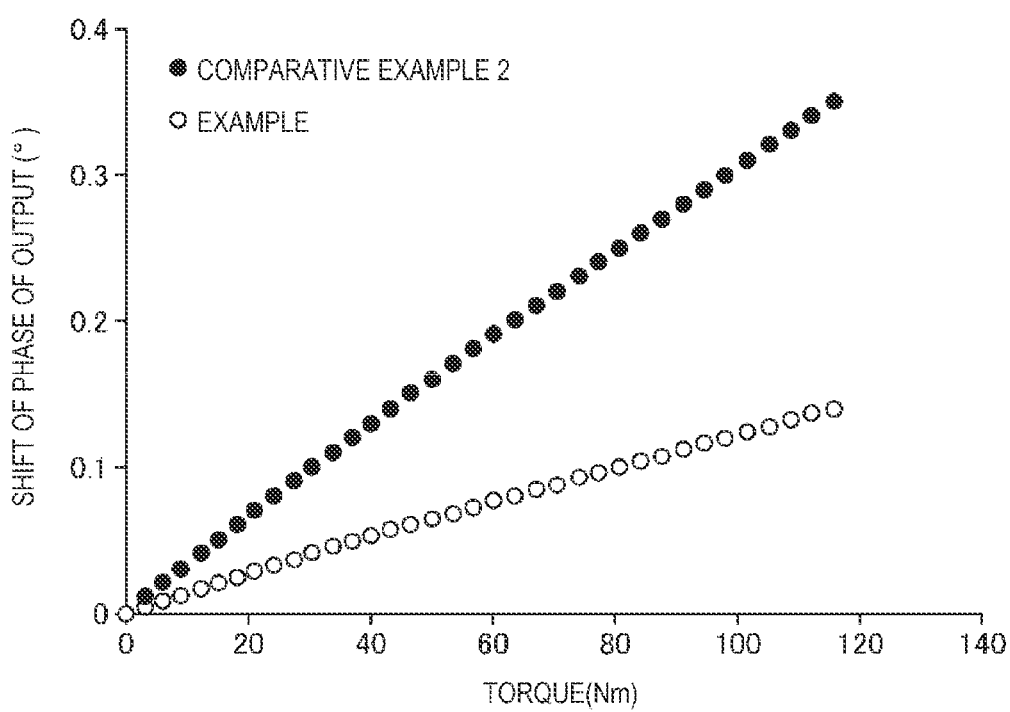
FIG. 11 is a graph showing a relation between torque input to gear devices and a shift between an input phase and an output phase in an example and a comparative example 2.

As it is evident from the graph shown in FIG. 11, in the gear device of the example, the shift of the phase of the output with respect to the input was further suppressed than in the gear device of the comparative example 2. Therefore, it was recognized that the responsiveness was higher in the gear device of the example than in the gear device of the comparative example 2.

What is claimed is:

1. A gear device comprising:
   an internal gear;
   an external gear having flexibility configured to partially mesh with the internal gear and rotate around a rotation axis relatively to the internal gear; and
   a wave generator configured to come into contact with an inner circumferential surface of the external gear and move a meshing position of the internal gear and the external gear in a circumferential direction around the rotation axis, wherein
   the external gear includes a cylindrical section including a first end portion with which the wave generator is in contact and a second end portion adjacent to the first end portion along the rotation axis,
   an inner circumferential surface of the first end portion includes a polished surface,
   an inner circumferential surface of the second end portion is an unpolished lathe-cut surface.

2. The gear device according to claim 1, wherein
   the lathe-cut surface includes a first circumferential groove extending in the circumferential direction around the rotation axis, and
   the first circumferential groove is formed in a spiral shape.

3. The gear device according to claim 2, wherein depth of the first circumferential groove is larger in a region separated from the polished surface than a region close to the polished surface on the lathe-cut surface.

4. The gear device according to claim 2, wherein depth of the first circumferential groove is smaller in a region separated from the polished surface than a region close to the polished surface on the lathe-cut surface.

5. The gear device according to claim 1, wherein the polished surface includes a second circumferential groove extending in the circumferential direction around the rotation axis.

6. The gear device according to claim 1, wherein
   the external gear includes external teeth provided at the first end portion, and
   length of the polished surface in an axial direction of the rotation axis is larger than length of the external teeth in the axial direction.

7. A robot comprising:
   a first member;
   a second member configured to turn with respect to the first member;
   the gear device according to claim 1 configured to transmit a driving force for turning the second member relatively to the first member; and
   a driving source configured to output the driving force to the gear device.

\* \* \* \* \*